No. 729,133. PATENTED MAY 26, 1903.
A. CHRISTERSSON.
APPARATUS FOR COUNTING PIECES OF GOODS.
APPLICATION FILED NOV. 24, 1902.
NO MODEL. 2 SHEETS—SHEET 1.
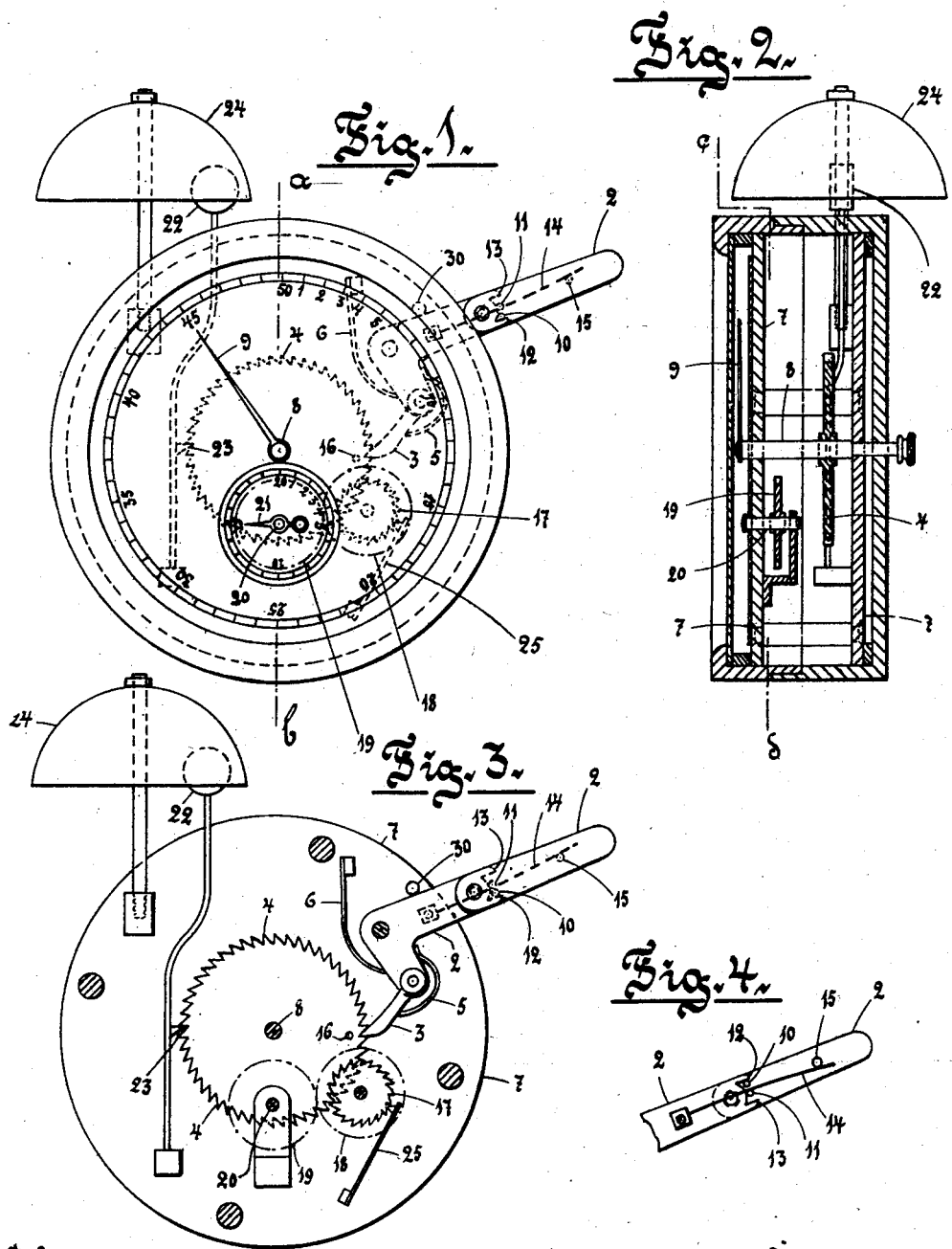
Witnesses:
Carl O. Sahlberg
Harry Karlson.
Inventor:
Albin Christersson No. 729,133. PATENTED MAY 26, 1903.
A. CHRISTERSSON.
APPARATUS FOR COUNTING PIECES OF GOODS.
APPLICATION FILED NOV. 24, 1902.
NO MODEL. 2 SHEETS—SHEET 2.
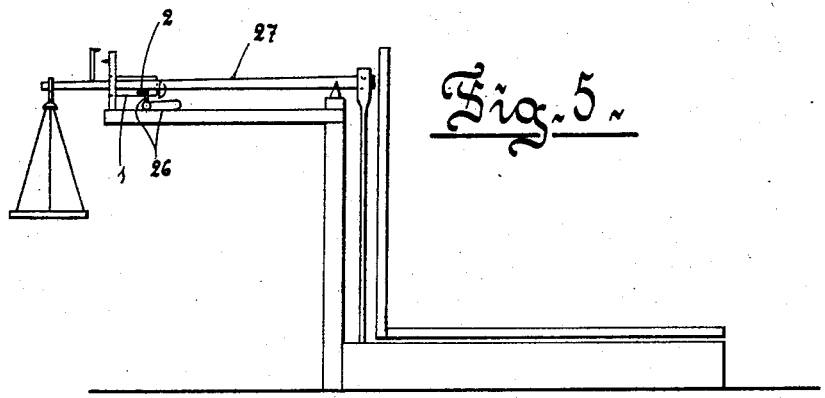
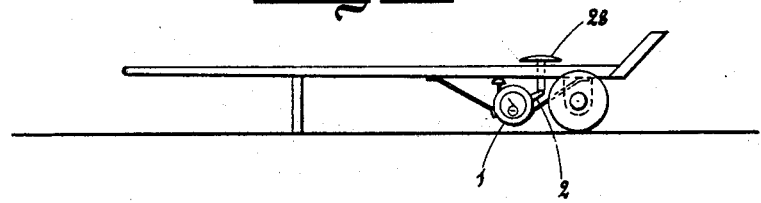
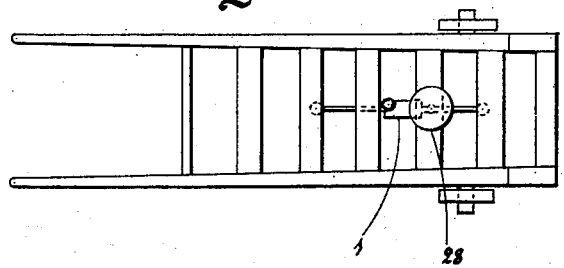
Witnesses:
Carl O. Sahlberg.
Harry Karlson.
Inventor:
Albin Christersson No. 729,133. Patented May 26, 1903.

UNITED STATES PATENT OFFICE.

ALBIN CHRISTERSSON, OF ETELHEM, SWEDEN.

APPARATUS FOR COUNTING PIECES OF GOODS.

SPECIFICATION forming part of Letters Patent No. 729,133, dated May 26, 1903.

Application filed November 24, 1902. Serial No. 132,684. (No model.)

*To all whom it may concern:*

Be it known that I, ALBIN CHRISTERSSON, a subject of the King of Sweden and Norway, residing at Etelhem, in the Kingdom of Sweden, have invented certain new and useful Improvements in Apparatus for Counting Pieces of Goods; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention consists in an apparatus for counting pieces of goods, to be applied, for instance, to scales in granaries for indicating the number of bags of grain weighed off, so that the person in charge of the weighing can check his own notations of the number of bags. Such an apparatus is more especially needed for scales on which a large number of weighings of the same kind take place—as, for instance, in sugar-factories, where a large number of carts loaded with raw material are to be weighed in succession.

The invention is illustrated in the accompanying drawings, wherein—

Figure 1 shows the apparatus in a front elevation. Fig. 2 shows the apparatus in a section on line *a b* of Fig. 1, viewed from the right. Fig. 3 shows the apparatus in a section on line *c d* of Fig. 2, viewed from the left, the protecting-case being thought removed. Fig. 4 is a detail which will be explained below. Fig. 5 shows the apparatus as applied to scales. Figs. 6 and 7 show the apparatus as applied to a bag-cart of the kind used for transporting grain-bags, Fig. 6 showing a side view, and Fig. 7 a top view, of the cart.

In Figs. 5, 6, and 7, 1 represents the apparatus in question. The apparatus consists of an oscillating bell-crank 2, (see Fig. 3,) which is provided with pawl 3, engaging with the ratchet-wheel 4. This is provided with fifty teeth corresponding to the fifty divisions of the large dial in Fig. 1. The apparatus evidently can be so arranged that the dial will have any other suitable number of divisions. The pawl 3 is actuated by a spring 5, attached to the bell-crank 2 and by which the pawl is held continually pressed against the ratchet 4. The bell-crank 2 is actuated by another spring 6 pressing it against the stop 30. This spring 6 is attached to one of the two parallel plates 7, which carry the mechanism. On the shaft 8 of the ratchet 4 is located the indicator 9, pointing to the divisions of the large dial in Fig. 1. Every time the bell-crank 2 swings to and fro the pawl of the ratchet 4 is advanced, and as a result the indicator 9 is moved forward one division on the large dial. For the case that the piece actuating the bell-crank 2 has a reciprocating movement the said bell-crank is provided with a kind of joint, as shown in Figs. 1, 3, and 4. Fig. 4 shows a portion of the bell-crank 2 viewed from below in Figs. 1 and 3. As evident from said figures, the bell-crank 2 is made in two jointed parts. Two pins 10 and 11 are fixed to the outer part and are arrested in their motion, as the said part moves, by two lugs 12 13 at the end of the inner part of the bell-crank 2. A spring 14 is attached to the latter inner part and presses against the pin 15 of the outer part. The parts of the bell-crank 2 consequently strive to remain in such a position that the pin 10 will bear on the lug 12, said parts then being in alinement with each other. If a piece actuating the bell-crank 2 from above in Figs. 1 and 2 has passed said bell-crank, it will be free to make a similar return movement— *i. e.*, to be raised once more above the bell-crank 2—inasmuch as the outer part of the bell-crank 2 can swing out of the way until the pin 11 strikes the lug 13. A pin 16, fixed to the ratchet 4, in each revolution of the latter engages with the teeth of another ratchet 17, advancing this ratchet one tooth. The motion of the ratchet 17 is transmitted by means of two gears 18 19 to the shaft 20. On the shaft 20 is fixed the indicator 21, pointing to the divisions on the smaller dial in Fig. 1. As seen from the drawings, the ratchet 17 is provided with twenty teeth and the small dial correspondingly with twenty divisions. The gears 18 and 19 are only shown by dotted lines in Figs. 1 and 3. Near the ratchet 4 is a spring clapper or striker 22, pressing, by means of a cog 23, against the ratchet 4. When the ratchet is rotated, the clapper 22 is set in motion and strikes against the bell 24 for each division that the indicator 9 is advanced. The clapper 22 also acts, by means of its cog 23, as a check-pawl for the ratchet 4. For the ratchet 17 a check-pawl 25 is provided. When the bell-crank 2 is swung once back and forth, the ratchet 4 is advanced one tooth, as mentioned above, the indicator 9 consequently for each oscillation advancing one division. Beyond the fiftieth division the smaller indicator 21 advances one division on the small dial, since the pin 16 engages with the ratchet 17 and advances said ratchet.

If, as in Fig. 1, the indicator 21 points to "15" and the indicator 9 to "45," the bell-crank 2 will have made $15 \times 50 + 45 = 795$ complete oscillations.

When the apparatus is used in combination with scales, (see Fig. 5,) it should preferably be placed in such a manner that the bell-crank 2 can be actuated by the lifter 26, which in well-known manner is swung upward between the weighings, so as to lock the beam 27 while the scales are being loaded. Every time the lifter 26 is swung upward, and consequently every time a weighing is done—for instance, of a bag of grain—the bell-crank 2, therefore, is given a swinging movement, so that the apparatus counts and indicates the number of bags weighed, as evident from the foregoing.

If the apparatus, as shown in Figs. 6 and 7, is applied to a bag-cart, the cart is provided, for instance, with a large button or knob 28, which is pressed down every time a bag is loaded on and the lower end of which actuates the bell-crank 2, so that the apparatus will indicate the number of bags transported on the cart.

I claim—

In an apparatus for counting pieces of goods, the combination of a swinging bell-crank 2 made in two jointed parts the outer one of which is provided with two pins 10, 11, the movements of which are limited by two lugs 12, 13 on the inner part of the bell-crank 2, the latter having attached to it a spring 14 pressing on a pin 15 at the outer part of the bell-crank 2, a pawl 3 pivoted to the bell-crank 2 and actuated by a spring 5 pressing it against a ratchet 4 on the shaft 8 of which is fixed an indicator 9 pointing to the divisions of a large dial, and a spring clapper or striker 22 bearing by means of a cog 23 against the ratchet 4 and adapted to strike a bell 24 when said ratchet is advanced, for the purpose set forth.

In testimony that I claim the foregoing as my invention I have signed my name in presence of two subscribing witnesses.

ALBIN CHRISTERSSON.

Witnesses:
CARL O. SAHLBERG,
HARRY KARLSON.